United States Patent [19]

Hergenrother et al.

[11] 4,179,556

[45] Dec. 18, 1979

[54] POLYPHOSPHAZENE POLYMERS CONTAINING SUBSTITUENTS DERIVED FROM KETOXIMES

[75] Inventors: William L. Hergenrother, Akron; Adel F. Halasa, Bath, both of Ohio

[73] Assignee: The Firestone Tire & Rubber Company, Akron, Ohio

[21] Appl. No.: 957,513

[22] Filed: Nov. 3, 1978

[51] Int. Cl.$^2$ .............................................. C08G 79/04
[52] U.S. Cl. .................................. 528/168; 528/374; 528/392; 528/399; 528/422
[58] Field of Search ................ 528/399, 168, 422, 374

[56] References Cited

PUBLICATIONS

Rosini et al., "Journal of Organic Chemistry" 1973, 38(5), pp. 1060–1061.

*Primary Examiner*—Wilbert J. Briggs, Sr.

[57] ABSTRACT

Polyphosphazene copolymers are prepared which are comprised of repeating units represented by the formulas:

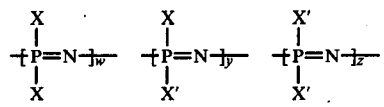

wherein X is represented by the formula:

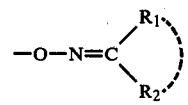

where $R_1$ and $R_2$ are independently selected from the group consisting of substituted and unsubstituted alkyl radicals containing from 1 to 15 carbon atoms, substituted and unsubstituted cycloalkyl, aryl, arylalkyl and heterocyclic ring; X' is selected from the group consisting of substituted and unsubstituted alkoxy, aryloxy, mercapto, and amino radicals, and mixtures thereof; and $20 \leq (w+y+z) \leq 50,000$ per polymer unit.

The polyphosphazene polymers of the present invention are prepared by the reaction of a ketoxime and an additional reactant such as alkanol, aryl alcohol, mercaptan, or amine with poly(dichlorophosphazene) in the presence of a tertiary amine. The polymers of this invention may be modified by crosslinking or curing.

The polymers of this invention can be utilized to form protective films and may also be utilized in applications such as molding, coatings, foams and the like.

13 Claims, No Drawings

POLYPHOSPHAZENE POLYMERS CONTAINING SUBSTITUENTS DERIVED FROM KETOXIMES

BACKGROUND OF THE INVENTION

Polyphosphazene polymers containing repeating

units in which various substituted and unsubstituted alkoxy, aryloxy, amino and mercapto groups are attached to the phosphorus atom and their method of preparation are described in the prior art as illustrated in the publication "Nitrogen-Phosphorus Compounds," Academic Press, New York, New York, 1972 by H. R. Allcock and "Poly(organophosphazenes)," Chemtech, Sept. 19, 1975, by H. R. Allcock and in such U.S. Pat. Nos. as 3,515,688; 3,702,833; 3,856,712; 3,974,242 and 4,042,561, the disclosures of which are herein incorporated by reference.

Aldoximes have been reacted with phosphonitilic chloride in the past, however, aldoxime substituted polyphosphazene polymers were not produced. A reaction of phosphonitrilic chloride in the presence of triethylamine converted aliphatic, aromatic and olefinic aldoximes into nitriles as described in the publication, "Journal of Organic Chemistry," 1973, 38(5), pages 1060-1, by Rosini et al.

None of the aforementioned publications or patents or for that matter, none of the prior art of which the applicants are aware, discloses or suggests polyphosphazene copolymers containing ketoxime substituents attached to the phosphorus atom of the polyphosphazene or methods of preparing such polymers.

SUMMARY OF THE INVENTION

This invention relates to polyphosphazene copolymers containing repeating

units in the polymer chain in which substituents derived from ketoximes are attached to the phosphorus atom and to a method of preparing such polymers. Substituent groups such as alkoxy, aryloxy, amino and mercapto groups are additionally substituted onto the polyphosphazene polymer in addition to the ketoxime substituents by either the method disclosed hereinafter or by prior art methods.

In accordance with the present invention, novel polyphosphazene polymers containing ketoxime substituents attached to the phosphorus atom are prepared by the reaction of the ketoxime with poly(dichlorophosphazene) and another substitutionally reactive compounds such as alkanols, aryl alcohols, mercaptans and amines in the presence of a tertiary amine. These polymers contain repeating units represented by the formulas:

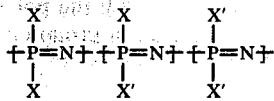

wherein X is represented by the formula:

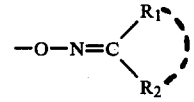

where $R_1$ and $R_2$ are independently selected from the group consisting of substituted and unsubstituted alkyl radicals containing from 1 to 15 carbon atoms, substituted and unsubstituted cycloalkyl, aryl, arylalkyl and heterocyclic radicals or $R_1$ and $R_2$ can be taken together to form a cyclic ring; X' is selected from the group consisting of substituted and unsubstituted alkoxy, aryloxy, mercapto and amino radicals, and mixtures thereof; and $20 \leq (w+y+z) \leq 50,000$ per polymer unit.

In the copolymer units represented by the above formulas, all X substituent groups can be the same or they can be mixed and all X' substituent groups can be the same or can be mixed. In the mixtures, the X substituent groups can be mixtures of different ketoxime groups and the X' substituent groups can be mixtures of alkoxy, aryloxy, amino and mercapto groups.

DETAILED DESCRIPTION OF THE INVENTION

The polyphosphazene polymers of the invention can be represented by the formula:

$$[NP(X)_a(X')_b]_n$$

wherein n is from 20 to 50,000 and $(a+b=2)$ and a and b are greater than zero.

The specific proportion of X to X' substituent groups incorporated in the copolymers of the invention can vary considerably depending upon chemical and physical properties desired in the copolymer and the particular end use application for which the copolymer is intended. Thus, for applications such as molding, coatings, foams and the like, the copolymer should contain at least ten mole percent of the X substituent.

The homopolymer, that is, where all substituent groups on the polyphosphazene polymer are ketoxime derivatives, can not be prepared by the method of the present invention or by prior art methods. The polyphosphazene copolymer can contain ketoxime substituents in up to about 80% of the total possible substitution sites. It is very difficult to substitute a higher percentage of the possible site due to steric hindrance in substitution of the ketoxime derivatives.

The term polymer herein includes within its meaning copolymer, that is, polymer units containing more than one substituent in a non-repeating manner.

The polymers can be used to prepare protective films and may be utilized in applications such as moldings, foams, coatings, and the like.

METHODS OF POLYMER PREPARATION

The polymers are prepared by reacting a poly(dichlorophosphazene) having the formula $—(NPCl_2)_n—$, in which n is from 20 to 50,000, in the presence of a tertiary amine, with a ketoxime and any compound which is reactive with the poly(dichlorophosphazene) to form a substitution group on a phosphorus atom in the polyphosphazene. Examples of such compounds are discussed in the section entitled "Additional Reactive Compounds" below.

I. THE POLY(DICHLOROPHOSPHAZENE) POLYMER

The poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula $-\text{NPCl}_2)_n$, in which n can range from 20 to 50,000 or more. As described in the aforementioned references, the polymers are in general prepared by the thermal polymerization of cyclic oligomers having the formula $(\text{NPCl}_2)_m$, in which m is an integer from 3 to 7, with the cyclic trimer and tetramer often comprising up to 90% of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° C. to about $10^{-1}$ Torr to superatmospheric and times can range from 30 minutes to about 48 hours.

A preferred process for preparing the poly(dichlorophosphazene) polymers used in the process of this invention is described in the aforementioned incorporated U.S. Pat. No. 4,005,171.

II. THE KETOXIMES WHICH ARE USEFUL IN PREPARING THE POLYMERS OF THE PRESENT INVENTION

The ketoximes which can be used to form the polyphosphazene polymers of the present invention are represented by the following structural formula:

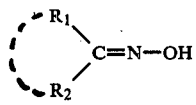

where $R_1$ and $R_2$ are independently selected from the group consisting of substituted and unsubstituted alkyl radicals containing from 1 to 15 carbon atoms, substituted and unsubstituted cycloalkyl, aryl, arylalkyl and heterocyclic radicals or $R_1$ and $R_2$ can be taken together to form a cyclic ring.

Illustrative examples of ketoximes which may be employed in producing the polymers of the present invention include: alkyl ketoximes such as acetoxime, di-isopropyl ketoxime, di-n-heptyl ketoxime, di-n-octyl ketoxime, di-n-undecyl ketoxime, di-tridecyl ketoxime, di-n-pentadecyl ketoxime, di-n-heptadecyl ketoxime, cyclohexanone oxime; aryl ketoximes such as diphenylketoxime (benzophenone oxime), phenyl-p-tolylketoxime, di-p-tolylketoxime, phenyl methylketoxime (acetophenone oxime), and phenyl ethylketoxime.

The preferred ketoxime compound for use in the present invention are acetoxime and cyclohexanone oxime. Mixtures of different ketoxime compounds can also be used in preparing the polymers of the invention.

III. ADDITIONAL REACTIVE COMPOUNDS

As indicated heretofore, the polyphosphazene copolymers of the invention in addition to the ketoxime substituent groups contain substituted or unsubstituted alkoxy, aryloxy, amino or mercapto groups or mixtures thereof.

Preferred copolymer substituent groups include:

Alkoxy groups (substituted or unsubstituted) derived from aliphatic alcohols having from 1 to 20 carbon atoms such as methanol, ethanol, propanol, isopropanol, n-butanol, sec-butanol, hexanol, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol; 2,2,3,3,3-pentafluoropropanol; 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols can be employed.

Aryloxy groups (substituted or unsubstituted) derived from aromatic alcohols including among others phenol; alkylphenols such as cresols, xylenols, p-, o-, and m-ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols can also be employed.

Amino groups derived from any of the amino compounds heretofore employed in the polyphosphazene polymer art. Thus, the amino groups may be derived from aliphatic primary and secondary amines such as methylamine, ethylamine, dimethylamine, methylethylamine and the like and aromatic amines such as those described in U.S. Pat. No. 4,042,561 as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Pat. No. 3,974,242 to Lanier et al can be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

Where the presence of crosslinking functionality is desired, in a polymer otherwise free of unsaturated crosslinking functionality, crosslinking functionality can be introduced in the polymer molecule through the use of ethylenically unsaturated substituent groups in addition to the groups X and X' set forth above. Examples of suitable crosslinking moieties and methods for their cure are set forth in U.S. Pat. Nos. 4,055,520; 4,061,606; 4,083,824; 4,073,825; and 4,076,658 which are hereby incorporated by reference and include $-\text{OCH}=\text{CH}$ and $-\text{OR}_3\text{CF}=\text{CF}_2$, as well as similar groups which contain unsaturation. Generally, when present, the moieties containing crosslinking functionality are usefully present in an amount between 0.1 mole percent to about 50 mole percent and usually between 0.5 mole percent and about 10 mole percent based on the replaceable chlorine in the starting poly(dichlorophosphazene).

IV. THE TERTIARY AMINE

The use of tertiary amine in preparing the polymers of the invention minimizes undesirable side reactions and at the same time acts as an effective acid scavenger.

Tertiary amines which can be employed in preparing the polymers of the invention are those represented by the general structure:

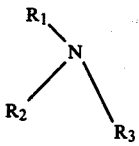

wherein $R_1$, $R_2$, and $R_3$ are alkyl containing from 1 to 8 carbon atoms. Thus, for example, the tertiary amine can be a trialkyl amine such as trimethylamine, triethylamine, tri-isopropylamine, tri-n-propylamine, tri-isobutylamine, tri-n-butylamine, and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine, N,N,N',N'-tetramethylethylene diamine, pyridine, N-methyl morpholine, N-methyl pyrrole, 1,4-diazobicyclo[2.2.2]octane (DABCO) and dipiperidyl ethane.

V. PROCESS CONDITIONS

As indicated above, the polymers of the present invention are prepared by reacting the poly(dichlorophosphazene) polymer, the ketoxime, and compounds listed in the group of "Additional Reactive Compounds" which can be substituted onto the poly(dichlorophosphazene) in the presence of a tertiary amine.

The specific reaction conditions and the proportion of ingredients employed in preparing these polymers can vary somewhat depending on factors such as the reactivity of the specific ketoxime utilized, the reactivity of the compound or compounds used to form copolymer substituents, the particular tertiary amine employed, and the degree of substitution desired in the final polymer. In general, reaction temperatures can range from about 25° C. to about 200° C. and times can range from 3 hours up to 7 days; with lower temperatures necessitating longer reaction times and higher temperatures allowing shorter reaction times. These conditions are, of course, utilized in order to obtain the most complete reaction possible, i.e., in order to insure the complete conversion of the chlorine atoms in the polymer to a corresponding linkage with the ketoxime substituent groups as well as forming linkages with the copolymer substituents.

The above reaction is ordinarily carried out in the presence of a solvent. The solvent employed in the reaction should be a solvent for the poly(dichlorophosphazene) polymer, the ketoxime, the compounds from which the copolymer substituents are derived, and the tertiary amine. In addition, the materials in the reaction zone should be reasonably free of water.

A mixture of the ketoxime and the additional reactive compound in a predetermined molar ratio is simultaneously reacted with the poly(dichlorophosphazene) to form a copolymer. An alternative method is the stepwise addition of the ketoxime and the additional reactive compound in any order to the poly(dichlorophosphazene) using tertiary amine, as described above, in each step, to form copolymers. The avoidance of substantial amounts of water in the reaction system is necessary in order to inhibit the premature, undesired reaction of the available chlorine atoms in the chloropolymer. Examples of suitable solvents which may be employed include diglyme, triglyme, tetraglyme, cyclohexane, chloroform, dioxane, dioxolane, methylene chloride, toluene, xylene and tetrahydrofuran. The amount of solvent employed is not critical and any amount sufficient to solubilize the reaction mixture can be employed.

In general, the amount of the combined total of the ketoxime compound and the copolymer forming compound reacted with the polychlorophosphazene polymer should be at least molecularly equivalent to the number of available chlorine atoms in the polymer being reacted. However, an excess of ketoxime in combination with the copolymer forming compounds should be employed in order to insure complete reaction of all the available chlorine atoms.

While ketoxime containing poly(phosphazene) polymers of the present invention have been prepared in the above-identified manner, that is, in the presence of a tertiary amine, alternative methods of preparation are available. The prior art methods of poly(dichlorophosphazene) substitution such as the reaction with sodium alkoxide as demonstrated in U.S. Pat. No. 3,370,020 to Allcock et al, may be used to substitute the ketoxime and the substituents derived from the compounds listed in the list of additional reactive compounds.

The prior art methods may be used to substitute the above-identified substituents onto the poly(dichlorophosphazene) or may be used to partially substitute the poly(dichlorophosphazene) with groups other than ketoxime groups whereas the remaining chlorines on the partially substituted poly(dichlorophosphazene) may be replaced with ketoxime groups using the tertiary amine substitution process.

The following examples are submitted for the purpose of further illustrating the nature of the present scope thereof. Parts and percentages referred to in the examples throughout the specification are by weight unless otherwise indicated.

EXAMPLE 1

A 10 oz. bottle was charged with 3.22 gms (44 millimoles) of acetone oxime, 3.2 cc (44 millimoles) of trifluoroethanol, 100 cc of dry tetrahydrofuran (hereinafter THF), 12.3 cc (88 millimoles) of triethylamine, and 36.5 gms (40.6 millimoles) of a 12.88% solution of polydichlorophosphazene in THF. The solution slowly became opaque as amine hydrochloride was formed. The bottle was heated at 70° C. in a rotary bath for 20 hours. After cooling, the bottle and its charge, the triethylamine hydrochloride was removed by centrifugation. The resultant solution when subjected to I. R. analysis showed a weak P-Cl band at 600 cm$^{-1}$ and new bands formed at 572, 550 and 532 cm$^{-1}$. The THF layer was coagulated in methanol to yield 5.4 gms of a brittle brown solid polymer. Washing of the salt cake with methanol yielded an additional 0.9 gms of polymer. The polymer has a Tg of −30.5° C. and a Tm of 85° C.

EXAMPLE 2

A 10 oz. bottle was charged with 5.0 gms (44 millimoles) of cyclohexanone oxime, 100 cc of THF, 12.3 cc (88 millimoles) of triethylamine, 3.2 cc (44 millimoles) of trifluoroethanol and 36.5 gms (40.6 millimoles) of a 12.88% solution of polydichlorophosphazene in THF. The bottle and its charge was heated at 120° C. for a period of 20 hours. After cooling, the triethylamine hydrochloride was removed by centrifugation. I. R. analysis of the resultant solution showed a weak P-Cl bond band at 600 cm$^{-1}$ and new bands formed at 560, 540 and 490 cm$^{-1}$. The THF layer was coagulated in hexane to yield 3.9 gms of a brown, rubbery polymer. Washing of the salt cake with methanol yielded an additional 6.0 gms of the brown, rubbery polymer.

EXAMPLE 3

A 10 oz. bottle was charged with 5.0 gms (44 millimoles) of cyclohexanone oxime, 100 cc of THF, 12.3 cc (88 millimoles) of triethylamine, 4.43 cc (44 millimoles) of para-chlorophenol and 36.5 gms (40.6 millimoles) of a 12.88% solution of polydichlorophosphazene in THF. The bottle and its charge was heated at 120° C. for a period of 20 hours, and then cooled followed by removal of the triethylamine hydrochloride by centrifugation. I. R. analysis of the resultant solution showed no P-Cl bond band at 600 cm$^{-1}$ with new bands being formed at 545 and 508 cm$^{-1}$. The THF layer was coagulated in methanol to yield 10.6 gms of a brown plastic material.

We claim:

1. A polyphosphazene polymer containing units represented by the formulas:

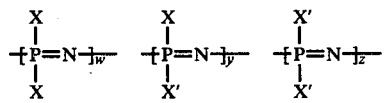

wherein X is —O—N=CR$_1$R$_2$ in which R$_1$ and R$_2$ are independently selected from a group consisting of substituted and unsubstituted alkyl radicals containing from 1 to 15 carbon atoms substituted and unsubstituted cycloalkyl, aryl, arylalkyl and heterocyclic radicals or R$_1$ and R$_2$ taken together form a cyclic ring, wherein X' is selected from the group consisting of chlorine and a substituted and unsubstituted alkoxy, aryloxy, amino and mercapto radical or mixtures thereof; $20 \leq (w+y+z) \leq 50,000$ per polymer, and X and X' are independently selected for each unit.

2. The polymer of claim 1 in which X is —O—N=CR$_1$R$_2$ in which R$_1$ and R$_2$ are alkyl groups containing 1 to 12 carbon atoms.

3. The polymer of claim 2 in which X is —O—N=C(CH$_3$)$_2$.

4. The polymer of claim 1 in which X is —O—N=C$_6$H$_{10}$ as X is derived from cyclohexanone oxime.

5. The polymer of claim 1 wherein X substituents of the polymer units is —O—N=CR$_1$R$_2$ in which R$_1$ and R$_2$ are alkyl groups containing from 1 to 15 carbon atoms wherein the X' substituent of said units is selected from the group consisting of chlorine, substituted and unsubstituted alkoxy, aryloxy, amino and mercapto radicals and mixtures thereof and wherein the units are randomly distributed.

6. The polymer of claim 5 wherein X is —O—N=C(CH$_3$)$_2$ and X' is —OCH$_2$CF$_3$.

7. The polymer of claim 5 wherein X is —O—N=C(CH$_3$)$_2$ and X' is —O—C$_6$H$_4$—p—Cl.

8. A method of preparing polyphosphazene polymers containing units represented by the formulas:

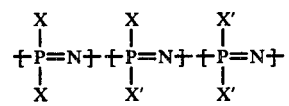

wherein X is —O—N=CR$_1$R$_2$ in which R$_1$ and R$_2$ are independently selected from the group consisting of alkyl radicals containing from 1 to 15 carbon atoms, substituted and unsubstituted cycloalkyl, aryl, arylalkyl and heterocyclic radicals or R$_1$ and R$_2$ taken together form a cyclic ring, wherein X' is selected from the group consisting of chlorine, substituted and unsubstituted alkoxy, aryloxy, amino mercapto radicals and mixtures thereof; said method comprising reacting a poly(dichlorophosphazene) polymer having the formula —NPCl$_2$)$_n$, wherein n is from 20 to 50,000 with a ketoxime in the presence of a tertiary amine, optionally followed by the addition of an alkanol, aryl alcohol, amine, mercaptan or a mixture thereof in the presence of a tertiary amine.

9. The method of claim 8 wherein the ketoxime is acetoxime.

10. The method of claim 8 wherein the ketoxime is cyclohexanone oxime.

11. The method of claim 8 wherein X is derived from acetoxime and X' is derived from trifluoroethanol.

12. The method of claim 7 wherein X is derived from acetoxime and X' is derived from p-chlorophenol.

13. The method of claim 9 wherein the tertiary amine is triethylamine.

* * * * *